United States Patent [19]
Uchida et al.

[11] 3,787,749
[45] Jan. 22, 1974

[54] AUTOMATIC SYNCHRONIZING SYSTEM

[75] Inventors: Kozo Uchida; Naohisa Nakaya; Koji Suzuki, all of Tokyo, Japan

[73] Assignee: Iwata Electric Company, Tokyo, Japan

[22] Filed: Aug. 20, 1969

[21] Appl. No.: 851,589

[30] Foreign Application Priority Data
Aug. 23, 1968  Japan.............................. 43/59921

[52] U.S. Cl...................... 315/19, 328/72, 328/179
[51] Int. Cl.............................................. H01j 29/70
[58] Field of Search......... 328/63, 72, 73, 179, 151; 315/18, 19; 307/228

[56] References Cited
UNITED STATES PATENTS

| | | | |
|---|---|---|---|
| 2,863,055 | 12/1958 | Kuehn et al. | 328/179 X |
| 2,980,858 | 4/1961 | Grondin et al. | 328/63 |
| 3,080,487 | 3/1963 | Mellott et al. | 328/63 X |
| 3,153,762 | 10/1964 | Johnson | 328/63 |
| 3,213,375 | 10/1965 | St. John | 328/63 |

OTHER PUBLICATIONS
Instruction Manual for Tektronix Model 453 Oscilloscope, 1965.

*Primary Examiner*—Maynard R. Wilbur
*Assistant Examiner*—H. A. Birmiel
*Attorney, Agent, or Firm*—Charles E. Pfund, Esq.; Chittick, Thompson & Pfund

[57] ABSTRACT

In an automatic synchronizing system comprising a synchronizing circuit including a variable element, a sampling device and a synchronism control circuit which operates to differentiate the output from the sampling device to vary the variable element, to stop the variation of the variable element and to maintain the stopped condition, there is provided a control circuit responsive to the cessation of operation of either one of the synchronizing circuit or the sampling device to start either one of the synchronizing circuit, sampling device and the synchronism control circuit to continue to find a point of synchronism even in the absence of a synchronizing signal for a predetermined interval or even when the amplitude of the synchronizing signal is small. A time axis circuit may be added which may be controlled by the control circuit in the same manner.

2 Claims, 5 Drawing Figures

AUTOMATIC SYNCHRONIZING SYSTEM

CROSS-REFERENCE TO RELATED APPLICATIONS

This application is related to Applications Ser. No. 851,609, filed Aug. 20, 1969, entitled AUTOMATIC SYNCHRONIZING SYSTEMS FOR SAMPLING DEVICES, now U.S. Pat. No. 3,633,066 issued on Jan. 4, 1972, and Ser. No. 851,588, filed Aug. 20, 1969, entitled AUTOMATIC SYNCHRONIZING SYSTEM, filed on even date herewith.

BACKGROUND OF THE INVENTION

This invention relates to a novel automatic synchronizing system for apparatus requiring a synchronizing signal such as an oscilloscope, a pulse generator and the like or a sampling device such as a sampling oscilloscope, wherein an output pulse synchronized with a synchronizing signal input can be stably and automatically derived out and a point of synchronism can be automatically obtained by controlling a variable element in the synchronizing circuit even when the amplitude of the synchronizing signal input is small or there is no such signal input.

In the system of the type referred to above, as the frequency, amplitude and waveform of the synchronizing input signal vary in various manner, in order to provide output pulses synchronized with such various input signals it has been the practice to manually vary the synchronizing level of the signal inputs in the synchronizing circuit or to set the synchronizing circuit in the self exciting condition to manually vary its frequency of self excitation. In other words, a variable element such as voltage or current of the synchronizing circuit is varied by manually adjusting it.

In order to obviate such troublesome manual adjustment, the applicants filed of even date herewith, a system outlined hereunder with reference to FIGS. 1 and 2. As shown in FIG. 1, an input terminal 10 for the synchronizing signal input is connected to a synchronizing circuit 11 and the output of circuit 11 and the synchronizing signal input or a signal synchronized therewith are supplied to a sampling circuit 13 via an input terminal 12 to provide a sampling signal of the input signal. The sampling signal is treated in a synchronism control circuit 14 to vary a variable element (not shown) in the synchronizing circuit 11 by the output from the synchronism control circuit 14. Synchronism control circuit 14 operates to differentiate the sampling signal to stop the variation of the variable element in the synchronizing circuit when the amplitude of the differentiated waveform becomes minimum whereby to automatically maintain this condition. Assuming now that $V(t)$ represents the waveform that is sampled by sampling circuit 13 and maintained thereby and that $Y$ represents the differentiated value of $V(t)$ with respect to time, then $Y$ will be shown by $$Y = (dV(t))/dt$$

The absolute value of $Y$, that is $|Y|$ becomes minimum when a point of synchronism is reached. When the variable element included in the synchronizing circuit is varied from its lower limit to its upper limit, or over its entire range, $|Y|$ manifests its minimum value at a single point or a plurality of points. For the sake of description, FIG. 2 shows a case wherein $|Y|$ has a single minimum value, but following explanation applies equally irrespective of the number of minimum values of $|Y|$. In FIG. 2, the abscissa represents the variable element and the value of $X$ corresponding to the minimum value of $|Y1|$ is represented by Xo. When $X$ is varied to obtain the minimum value of $|Y1|$min or a value very close thereto and when $X$ is fixed to that point, then the value of $X$ will be very close to Xo. Under this condition, when synchronism becomes out of step due to some variation in the parameter, for example, where the amplitude or frequency of the signal input varies, $X$ begins to vary again to search the point of $|Y1|$min or a point very close thereto, and upon finding such point $X$ is fixed to that point. In this manner, the synchronism control circuit 14 operates to automatically fix the value of $X$ at or near $|Y1|$min.

If it is assumed now that $X$ varies in a range of from Xa to Xz and that in the range of from Xa to Xc (Xc < Xz) the synchronizing circuit does not operate in the absence of any synchronizing signal input but operates upon reception of a synchronizing signal to generate a signal synchronous therewith, and that the synchronizing circuit performs self excitation, even in the absence of the synchronizing signal, to generate a pulse in a range from Xc to Xz then between Xa and Xc, the sensitivity of the circuit to the synchronizing signal input decreases toward Xa. In other words, the synchronizing circuit senses only large synchronizing signal inputs and increases its sensitivity from Xa to Xc. Further, from Xc to Xz, the synchronizing circuit operates to convert a received synchronizing signal having a frequency higher than its frequency of self excitation into a pulse of a frequency lower than a definite frequency synchronous to said synchronizing frequency by the pull-in phenomenon.

In such a synchronizing circuit, if the amplitude of the synchronizing signal input is small, in a range from Xa and Xb, (where Xb is an arbitrary value between Xa and Xc) there is a case wherein the synchronizing circuit does not operate. When $X$ is equal to Xa, as the synchronizing circuit does not operate, no pulse will be generated. Accordingly, no sampled waveform $V(t)$ and hence $Y$ can be obtained. Thus, there is a defect that $X$ is fixed to Xa so that the point of synchronism can not be obtained.

SUMMARY OF THE INVENTION

It is therefore an object of this invention to provide a new and improved synchronizing system capable of controlling a variable element of a synchronizing circuit to find out a point of synchronism even when the amplitude of the synchronizing signal is small or there is no synchronizing signal.

Another object of this invention is to provide an improved synchronizing system suitable for use in oscilloscopes, pulse generators, and sampling devices such as sampling oscilloscope which require a synchronizing signal.

Briefly stated, in accordance with a preferred embodiment of this invention, there is provided an automatic synchronizing system comprising a synchronizing circuit including a variable element, a sampling device, a synchronism control circuit which operates to differentiate the output from the sampling device to vary the variable element, to stop variation of the variable element upon reaching synchronism and to maintain the stopped condition and a control circuit which senses stopping of operation of either one of the synchronizing circuit and the sampling device to start either one of the synchronizing circuit, sampling device and the synchronism control circuit to continue to find out a point of synchronism even in the absence of a synchronizing signal for a predetermined interval or even when the amplitude of the synchronizing signal is small.

According to a modified embodiment of this invention, a time axis circuit is added to the automatic synchronizing circuit which is similarly controlled by the control circuit.

BRIEF DESCRIPTION OF THE DRAWING

The invention can be more fully understood from the following detailed description taken in connection with the accompanying drawing in which;

FIGS. 3 and 4 are block diagrams illustrating different embodiments of this invention and FIG. 5 shows a block diagram of a sampling device of a sampling oscilloscope and the like.

DESCRIPTION OF THE PREFERRED EMBODIMENTS

Figure 1:
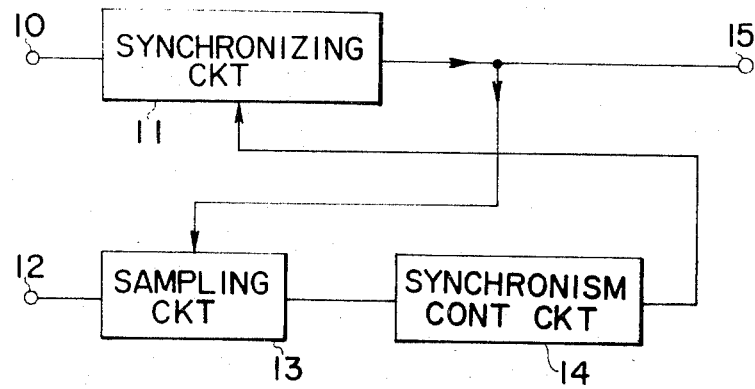
FIG. 1 is a block diagram of an automatic synchronizing system, as disclosed in applicants' copending application.
Figure 2:
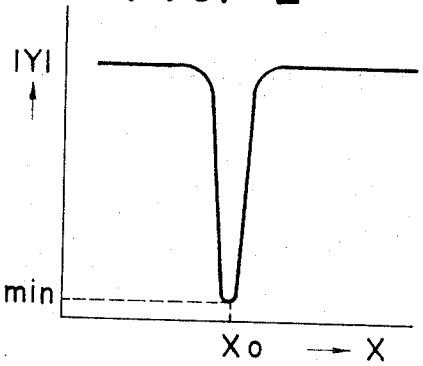
FIG. 2 show a graph to explain the principle of the automatic synchronizing system.
Figure 3:
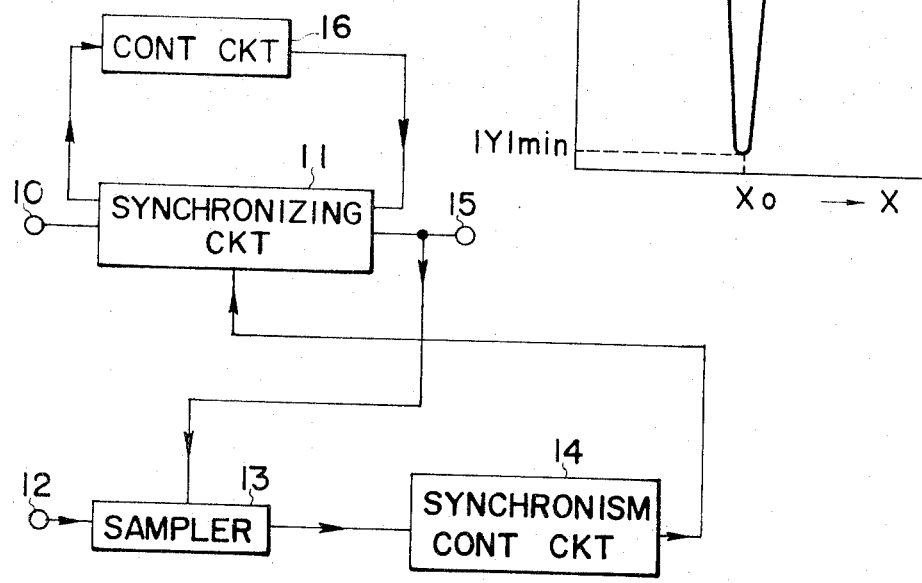

Referring now to FIG. 3 illustrating a block diagram of this invention a control circuit 16 for controlling synchronizing circuit 11 is added to the block diagram shown in FIG. 1. The control circuit functions to initiate its operation when the synchronizing circuit 11 stops its operation for more than a predetermined interval to provide an output pulse for the synchronizing circuit. For example, when the synchronizing circuit 11 stops its operation for more than 100 microseconds control circuit 16 operates to cause synchronizing circuit 11 to generate an output pulse of 10KHz every 100 microseconds even when the amplitude of the synchronizing signal applied to the synchronizing circuit is small or even when there is no synchronizing signal. As a result, a sampler 13 causes the synchronism control circuit 14 to operate to constantly find the point of synchronism.

Figure 4:
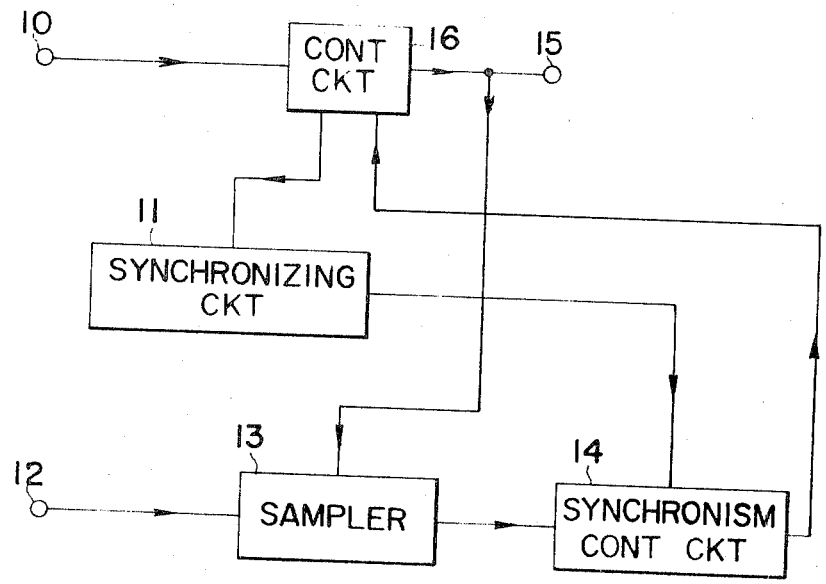

FIG. 4 shows a modified embodiment of this invention. In this embodiment, in response to the cessation of operation of the synchronizing circuit for more than a predetermined interval, control circuit 11 operates to start synchronism control circuit 14 to cause it to find out the point of synchronism even in the absence of the synchronizing signal or even when the amplitude thereof is small.

Although not shown, the same object can also be accomplished by constructing the control circuit such that it will sense cessation of the operation of sampler 13 for more than a predetermined interval so as to start synchronizing circuit 16 or synchronism control circuit 14.

Although in the embodiment shown in FIG. 3 control circuit 16 senses cessation of operation of the synchronizing circuit 11 to start the same, the control circuit 16 may be arranged to start sampler 13 or synchronism control circuit 14. In the same manner, the control circuit 11 shown in FIG. 4 can also be arranged to start sampler 13 or synchronism control circuit 14. Further, while in said two embodiments control circuit 16 is constructed to sense stopping of operation of the synchronizing circuit, according to this invention, control circuit 16 can also be arranged to sense cessation of the operation of either one of sampler 13 and synchronizing circuit 11 to start either one of synchronizing circuit 11, sampler 13 and synchronism control circuit 14.

Figure 5:
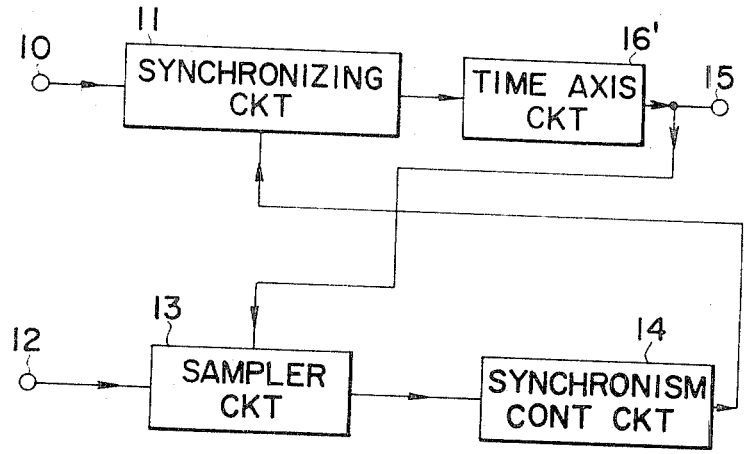

Further, this invention is also applicable to a sampling device such as a sampling oscilloscope and the like. As shown in FIG. 5, the block diagram of such a sampling device includes a time axis circuit 16 interposed between the synchronizing circuit 11 and terminal 15 of FIG. 1 and, as a result, it is seen that the invention is applicable to such a circuit. In this case, the control circuit provided in accordance with this invention is arranged to sense cessation of operation of at least one of synchronizing circuit 11, sampler circuit 13 and item axis circuit 16' to start either one of synchronizing circuit 11, sampling circuit 13, time axis circuit 16' and synchronism control circuit 14.

Thus, according to this invention, in an automatic synchronizing system wherein a variable element in a synchronizing circuit is varied automatically by means of a synchronism control circuit and upon reaching synchronism the variation of the variable element is stopped and that condition is maintained, a control circuit for effecting the control function described above is provided thus enabling the point of synchronism even in the absence of the synchronizing signal over a predetermined interval or when the amplitude thereof is small. Thus the synchronizing system of this invention can be used with advantages for devices which require synchronizing signals such as an oscilloscope and a pulse generator as well as for sampling devices and the like.

Although the invention has been shown and described by illustrating preferred embodiments thereof, it should be understood that the invention is by no means limited to these particular embodiments but many changes and modifications will occur to one skilled in the art without departing from the spirit and scope of the invention.

What is claimed is:

1. In an automatic synchronizing system having a synchronizing circuit including a variable element, a sampling device, and a synchronism control circuit which operates to differentiate the output from said sampling device to vary said variable element in said synchronizing circuit, said synchronism control circuit further operating in response to a minimum in said differentiated output to stop said variation of said variable element upon reaching synchronism and to maintain the stopped condition, the improvement which comprises control circuit means for sensing stopping of operation of either one of said synchronizing circuit and said sampling device and operable in response to said stopping to start at least one of said synchronizing circuit, sampling device or said synchronism control circuit to continue to find a point of synchronism even in the absence of a synchronizing signal for a predetermined interval or even when the amplitude thereof is small.

2. In a sampling device such as a sampling oscilloscope having a synchronizing circuit including a variable element, a sampling device, a time axis circuit and a synchronism control circuit which functions to differentiate the output from said sampling device to vary said variable element in said synchronizing circuit, said synchronizing control circuit also functioning in response to a minimum in said differentiated output to stop said variation of said variable element upon reaching synchronism and to maintain the stopped condition, and an automatic synchronizing system for said sampling device, the improvement comprising control circuit means for sensing stopping of operation of either one of said synchronizing circuit, sampling device and time axis circuit and operable in response to said stopping to start at least one of said synchronizing circuit, sampling device, synchronism control circuit or time axis circuit to continue to find a point of synchronism even in the absence of a synchronizing signal for a predetermined interval or even when the amplitude thereof is small.

* * * * *

UNITED STATES PATENT OFFICE
CERTIFICATE OF CORRECTION

PATENT NO. : 3,787,749
DATED : January 22, 1974
INVENTOR(S) : Kozo Uchida, Naohisa Nakaya; Koji Suzuki It is certified that error appears in the above-identified patent and that said Letters Patent are hereby corrected as shown below:

In the legend, "[73] Assignee: Iwata Electric Company, Tokyo, Japan" should read:

-- [73] Assignee: IWATSU ELECTRIC COMPANY, LTD., Tokyo, Japan --

Signed and Sealed this second Day of September 1975

[SEAL]

Attest:

RUTH C. MASON
Attesting Officer

C. MARSHALL DANN
Commissioner of Patents and Trademarks